United States Patent [19]

MacDougall et al.

[11] 4,253,147
[45] Feb. 24, 1981

[54] MEMORY UNIT WITH PIPELINED CYCLE OF OPERATIONS

[75] Inventors: James R. MacDougall; David L. Richter, both of Plano, Tex.

[73] Assignee: Rockwell International Corporation, El Segundo, Calif.

[21] Appl. No.: 28,621

[22] Filed: Apr. 9, 1979

[51] Int. Cl.³ .............................................. G06F 9/30
[52] U.S. Cl. .................................................... 364/200
[58] Field of Search ................. 364/200 MS File, 200

[56] References Cited

U.S. PATENT DOCUMENTS

| | | | |
|---|---|---|---|
| 3,231,725 | 1/1966 | Davis et al. .......................... 364/738 |
| 3,349,375 | 10/1967 | Seeber et al. ........................ 364/200 |
| 3,811,114 | 5/1974 | Lemay et al. ........................ 364/200 |
| 3,840,861 | 10/1974 | Amdahl et al. ...................... 364/200 |
| 3,875,391 | 4/1975 | Shapiro et al. ...................... 364/200 |
| 3,949,379 | 4/1976 | Ball ...................................... 364/200 |
| 4,025,771 | 5/1977 | Lynch, Jr. et al. .................. 364/200 |
| 4,040,030 | 8/1977 | Cassonnet .......................... 364/200 |
| 4,040,031 | 8/1977 | Cassonnet .......................... 364/200 |

Primary Examiner—David H. Malzahn
Attorney, Agent, or Firm—V. Lawrence Sewell; Howard R. Greenberg; H. Fredrick Hamann

[57] ABSTRACT

A memory unit is disclosed for receiving and executing instructions transmitted along buses. The memory unit includes registers and control logic that permit it to accept a second instruction from the bus and begin error checking procedures on the second instruction, all while completing the execution of a first instruction.

8 Claims, 9 Drawing Figures

MEMORY UNIT WITH PIPELINED CYCLE OF OPERATIONS

BACKGROUND OF THE INVENTION

This invention relates to data processing memory units, and particularly to units which accept instruction transmitted through a data processing system along buses.

In a processing system wherein multiple elements such as processors and memory units are connected along a message bus, only one of the elements at a time can utilize the bus, to send a word on it. Accordingly, it is important that each transmission on the bus be a successful one. For example, if a processor sends an instruction to a memory unit, and it happens that the memory unit is busy with another instruction and cannot accept the new instruction, then the processor will have to try again later to send the instruction. A bus cycle has been wasted, and if on retry the memory unit is again busy with an instruction from another processor, then another cycle will be wasted. In addition, the processor has been unable to complete the issuance of its instruction and may be held up in its operation as a result.

SUMMARY OF THE INVENTION

In accordance with the present invention, there is provided a memory unit which includes circuitry for accepting and executing a first memory instruction received on a bus. In addition, the memory unit includes means for accepting a second memory instruction from the bus before completion of the execution of the first memory instruction.

In a preferred embodiment, the memory unit according to the invention includes logic for beginning to check the second instruction for errors during the completion of the execution of the first memory instruction.

In addition, in a preferred embodiment, the memory unit according to the invention accepts its instructions from dual redundant buses, and can begin the task of choosing between the versions of the second instruction received on the two buses, during completion of the execution of the first memory instruction.

Thus, the memory unit of the invention is able to pipeline instructions, cueing them for execution of a second instruction immediately upon completion of a first. One of the principal advantages of such a unit is that it sharply reduces the probability that the memory unit will be unable to accept an instruction sent to it on the bus. This reduces the necessity for the sending unit to repeatedly send the second instruction until it finds the memory unit not busy. As a result, bus cycles are saved, and the sending unit is more frequently able to complete its sending task on the first transmission of an instruction to memory.

There are also advantages of pipelining in the operation of the memory unit itself. In a preferred embodiment, the memory unit is able to begin certain necessary tasks, including error checking, of a second instruction, before completing execution of a first instruction. This is particularly appropriate in an embodiment described in detail herein, wherein a memory unit examines duplicate versions of an instruction received on dual redundant buses, and chooses one of the versions. The memory can begin the process of selecting between the dual versions of a second instruction before the completion of execution of a first instruction.

DESCRIPTION OF A PREFERRED EMBODIMENT

Figure 1:
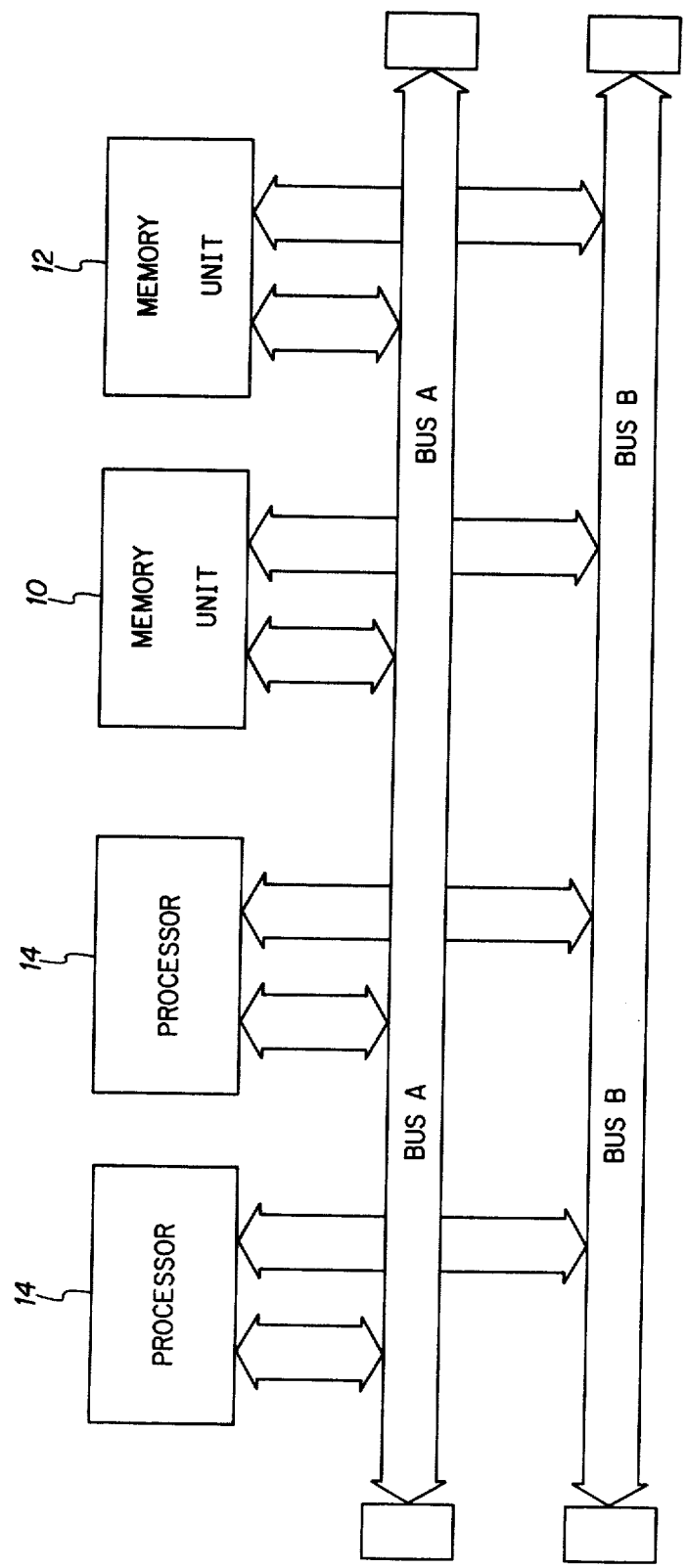
FIG. 1 is a block diagram of a data processing system utilizing dual redundant buses.

FIG. 1 illustrates a data processor system for which the memory unit of the present invention is particularly suitable. One or more memory modules or units, such as memory units 10 and 12, are interconnected with one or more processors 14 by means of signal conductor buses. When one of the processors 14 sends an instruction to a memory unit, it sends duplicate versions of the instruction on the duplicate buses A and B. The addressed memory unit checks the signals it receives from each of the buses A and B for errors. If an error is detected in the instruction received by the memory unit on one of the buses, then the memory unit chooses the information from the other bus to be utilized in the execution of the memory instruction. In the same way, when a memory unit sends information to a processor, it sends duplicate versions along each of the buses A and B, and the addressed processor chooses which version of the information it will accept.

Figure 2:
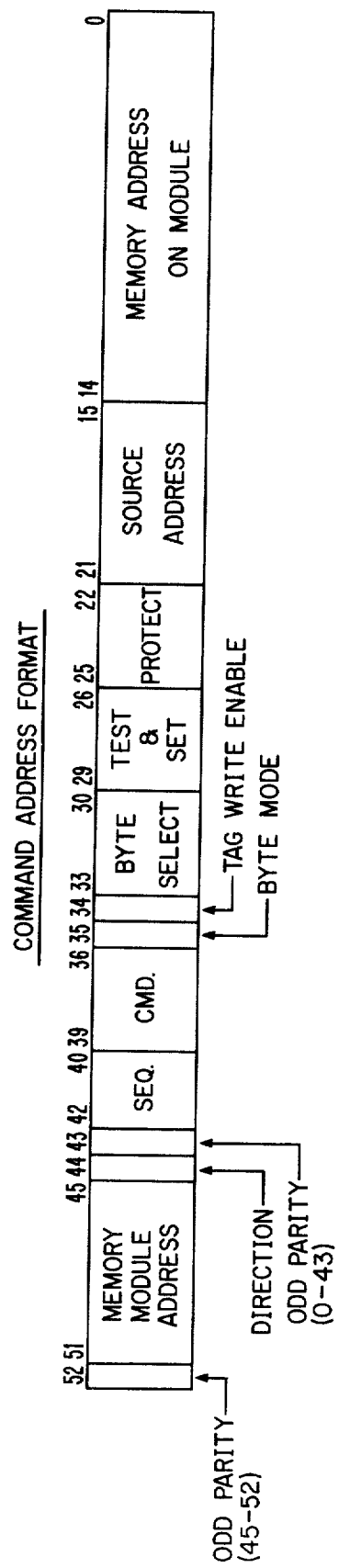
FIG. 2 illustrates the distribution of information in a bus word having a command address format.
Figure 3:
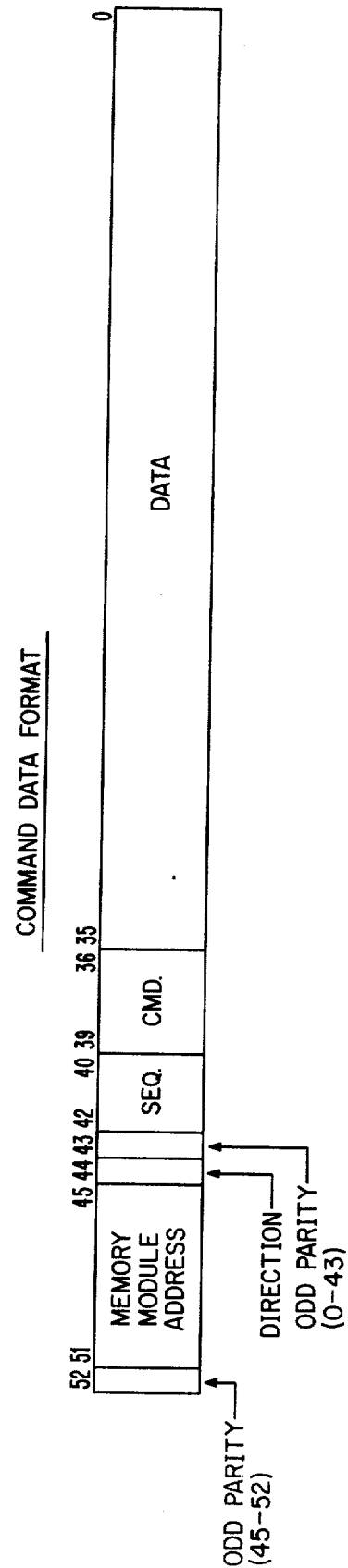
FIG. 3 illustrates the distribution of information in a bus word having a command data format.

FIGS. 2 and 3 illustrate formats for the transfer of information between processors and memory units on 53 bit buses. FIG. 2 illustrates a command address format, in which bits 0–14 contain a memory address on an individual memory module or unit. FIG. 3 is a command data format, in which bits 0–35 contain data.

To perform a read from memory, a processor can use the command address format of FIG. 2 to send to a particular memory unit the memory address to be read from. Then the memory unit can send back to the processor the data read from memory, using the command data format of FIG. 3.

To perform a write to memory, a processor can send to the memory unit the address in which data is to be written, using the command address format of FIG. 2. Immediately following transmission of the address information, the processor can send to the memory unit the data to be written, using the command data format of FIG. 3.

Figure 4:
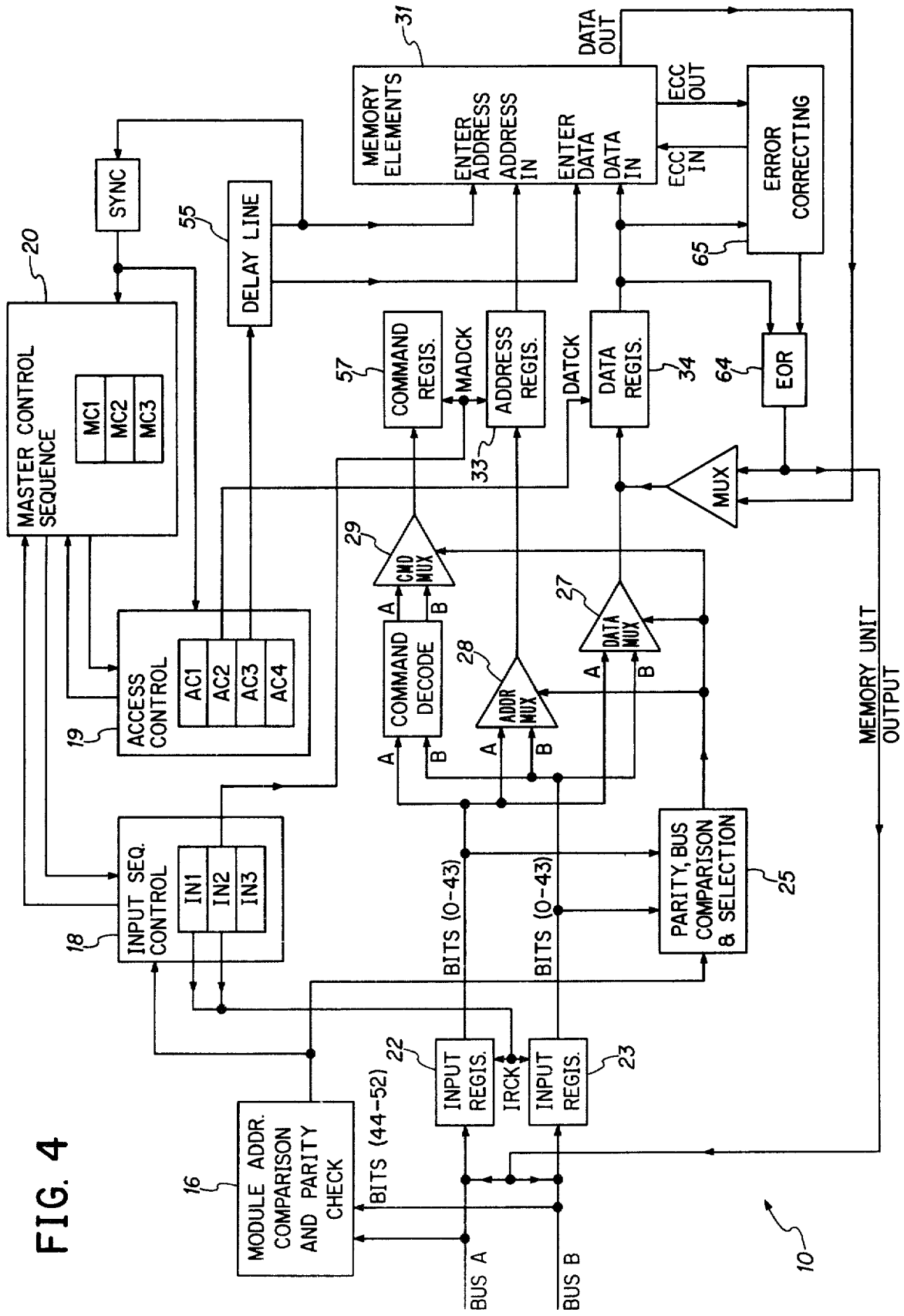
FIG. 4 is a block diagram of a memory unit according to the invention.

FIG. 4 is a block diagram of a memory unit 10 which in accordance with the principles of the invention. Signals appearing on buses A and B are immediately input to module address comparison and parity check circuitry 16. This circuit checks the memory module address appearing in bits 45–51 of each bus to determine whether the instruction appearing on the buses is addressed to this particular memory unit. In addition, circuit 16 checks the parity of bits 45-52 of each bus to determine whether the information is properly received. The results of these determinations from circuit 16 are passed along to control logic, including input sequence control 18 and bus selection logic 25. The results are used by the control logic to determine whether to utilize the information appearing on bus A or on bus B, or neither. A preferred embodiment of circuit 16 is shown in a related application entitled "Processing System with Dual Buses" by David L. Richter Ser. No. 25,815 filed Apr. 2, 1979.

If the memory unit 10 is in a condition to receive inputs, then input registers 22 and 23 will be clocked to accept bits 0-43 of buses A and B, respectively. Once these portions of the bus words are in the input registers, they are examined by parity, bus comparison and selection logic 25. Logic 25 checks the parity of bits 0-43 received from each of the buses, and compares these bits as received on one bus with those received on the other. The parity check comparison, along with the results from circuit 16, are used to determine whether information is totally properly received on each bus. Based on this determination, logic 25 selects whether to utilize the word received on bus A or bus B. The selection is made at data multiplexer 27, address multiplexer 28, and command multiplexer 29. If the decision is made by selection logic 25 to utilize the signals from neither bus, then for a write instruction it does not enable a write to memory elements 31. For a read instruction, it does not enable transmission of data from the memory unit to a processor. Details of the parity, bus comparison, and selection function can also be found in the related application referenced above.

If the instruction received from the buses is a read command or the first word of a write instruction, then the memory address contained in bits 0-14 is passed to address register 33 from one of the buses A and B selected at address multiplexer 28. If the instruction is the second word of a write instruction, then the data of bits 0-35 is entered into data register 34. From the address and data registers 33 and 34, the address and data are accessible to memory elements 31, which can be, for example, on a semiconductor memory chip. At this point in the execution of either a write or a read instruction, there remain a number of steps to be performed, as is understood in the art of utilizing memory chips. These will not be described herein; the present invention is concerned with the process of interfacing with the buses A and B and an ability to accept a new instruction from the buses while an old instruction is being executed in the memory unit 10.

Portions of the instruction word received on buses A and B progress through the various stages of memory unit 10 under the control of logic including an input sequence control 18, an access control 19 and a master control sequence 20. This logic is designed in such a way that memory unit 10 can accept a second instruction, while a first instruction is being executed. In fact, the operation of such functions as the parity, bus comparison, and selection logic 25 can begin on the second instruction, while the first instruction is completing execution. The details of accomplishing these operations are described in connection with further figures, beginning with FIG. 5.

Figure 5:
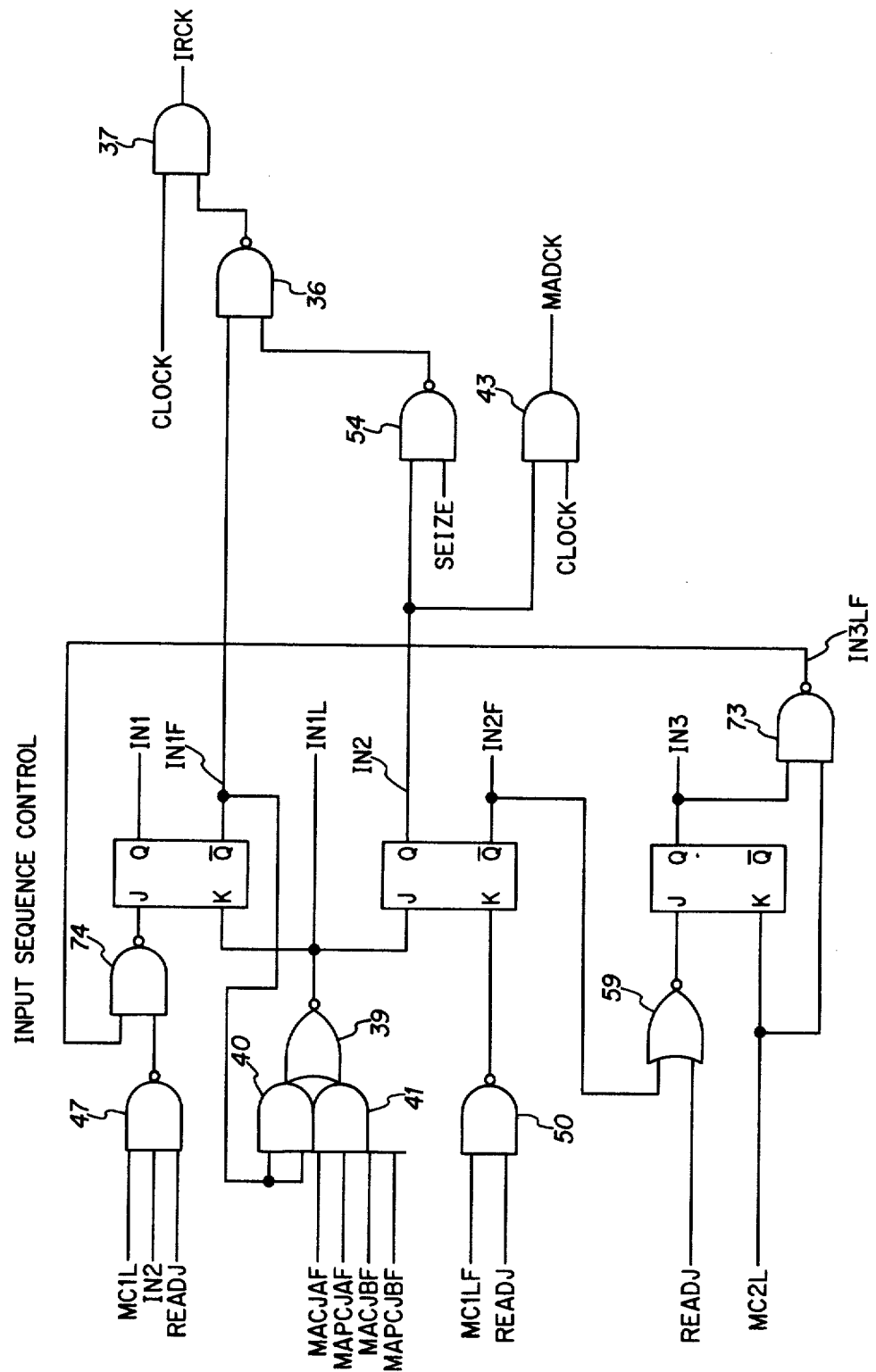
FIG. 5 is a logic diagram of an input sequence control in the memory unit of FIG. 4.
Figure 8:
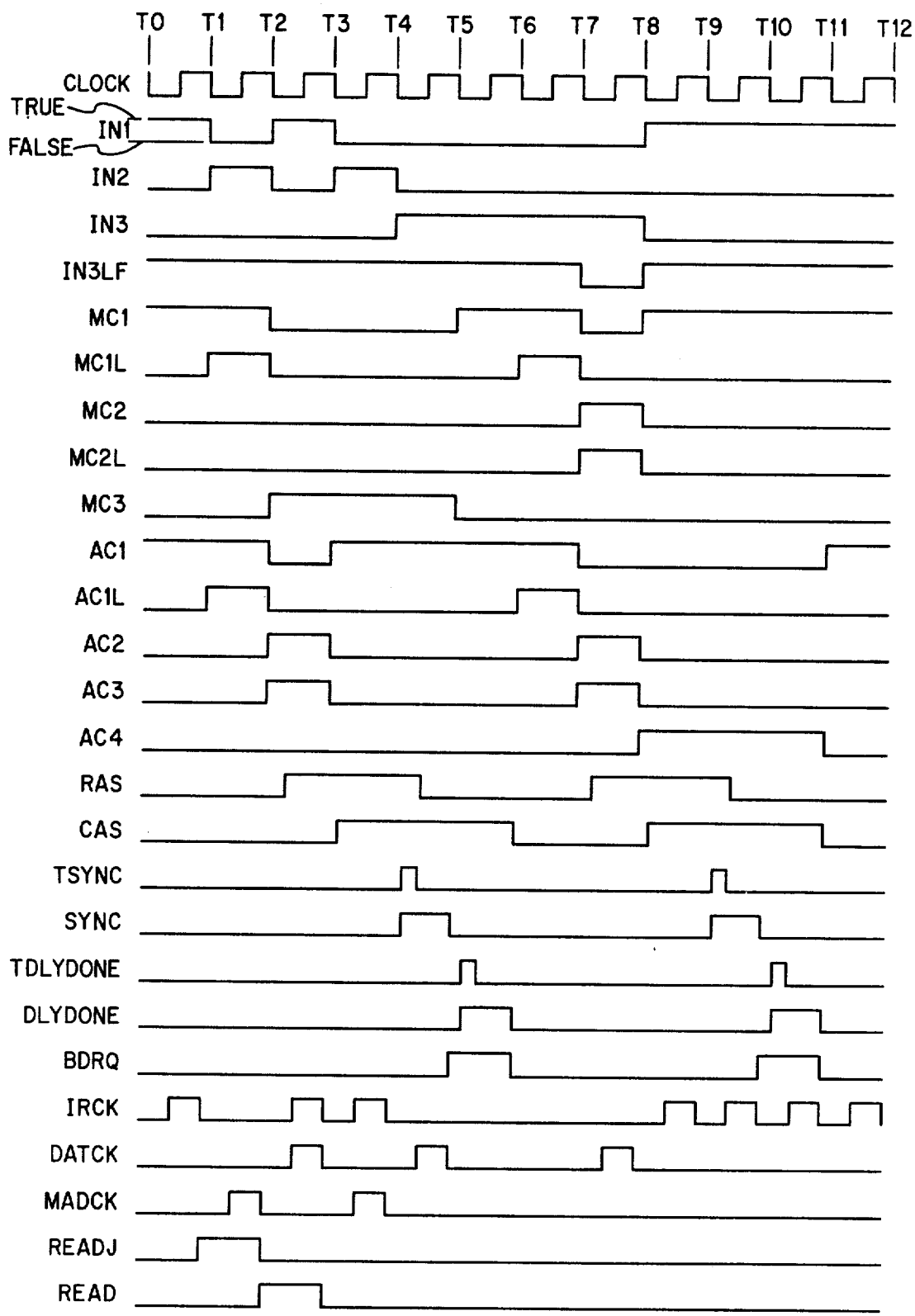
FIG. 8 is a timing diagram of operation of the memory unit of FIG. 4.

FIG. 5 shows the logic of input sequence control 18. Waveforms relative to control 18 and other events of the operation of memory unit 10 are shown in FIG. 8 through a sequence of clock intervals T0-T12. The waveforms illustrate an example in which memory unit 10 accepts and begins execution of a read instruction, and then accepts a write instruction.

Figure 6:
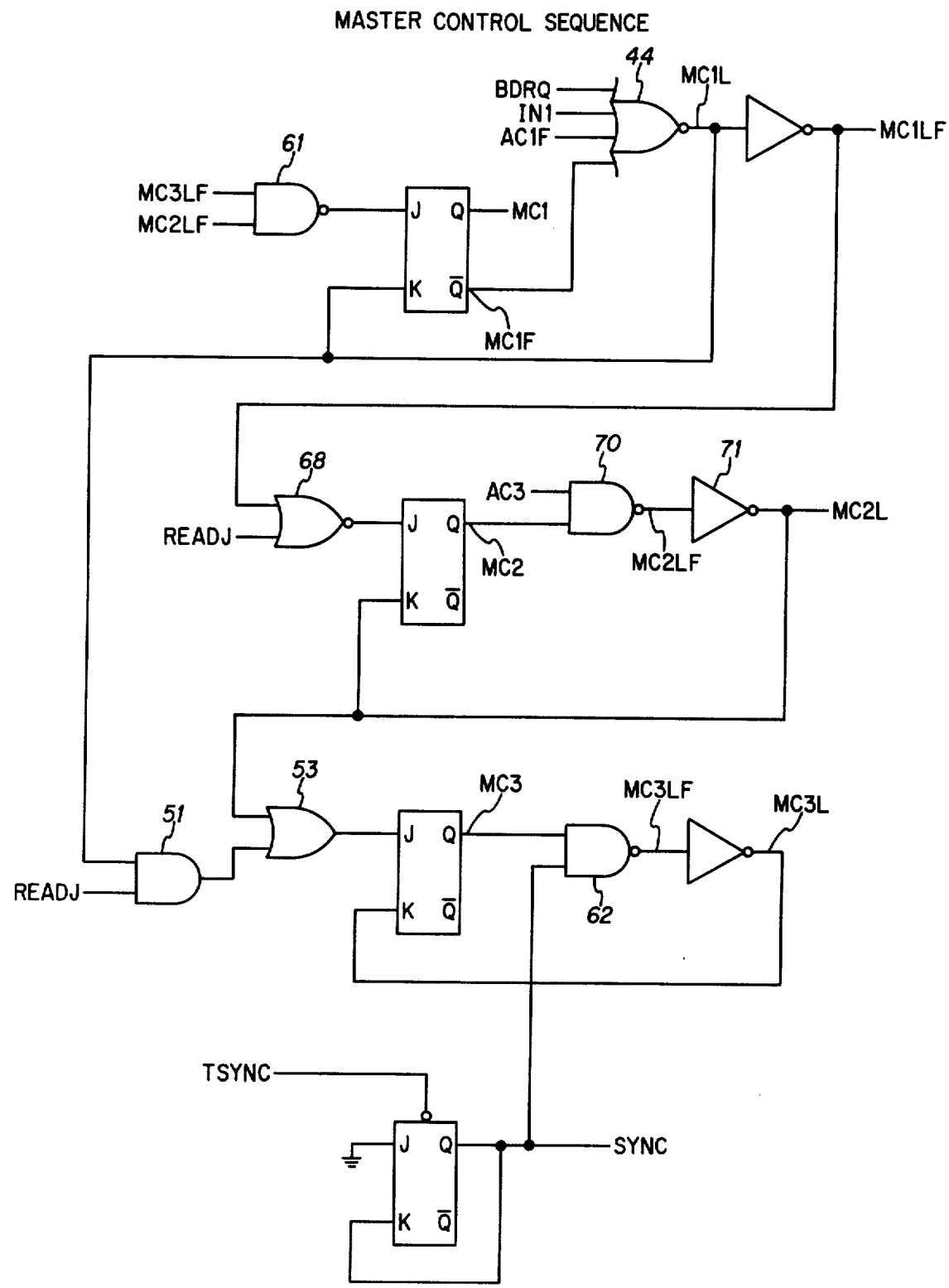
FIG. 6 is a logic diagram of a master control sequence in the memory unit of FIG. 4.
Figure 7:
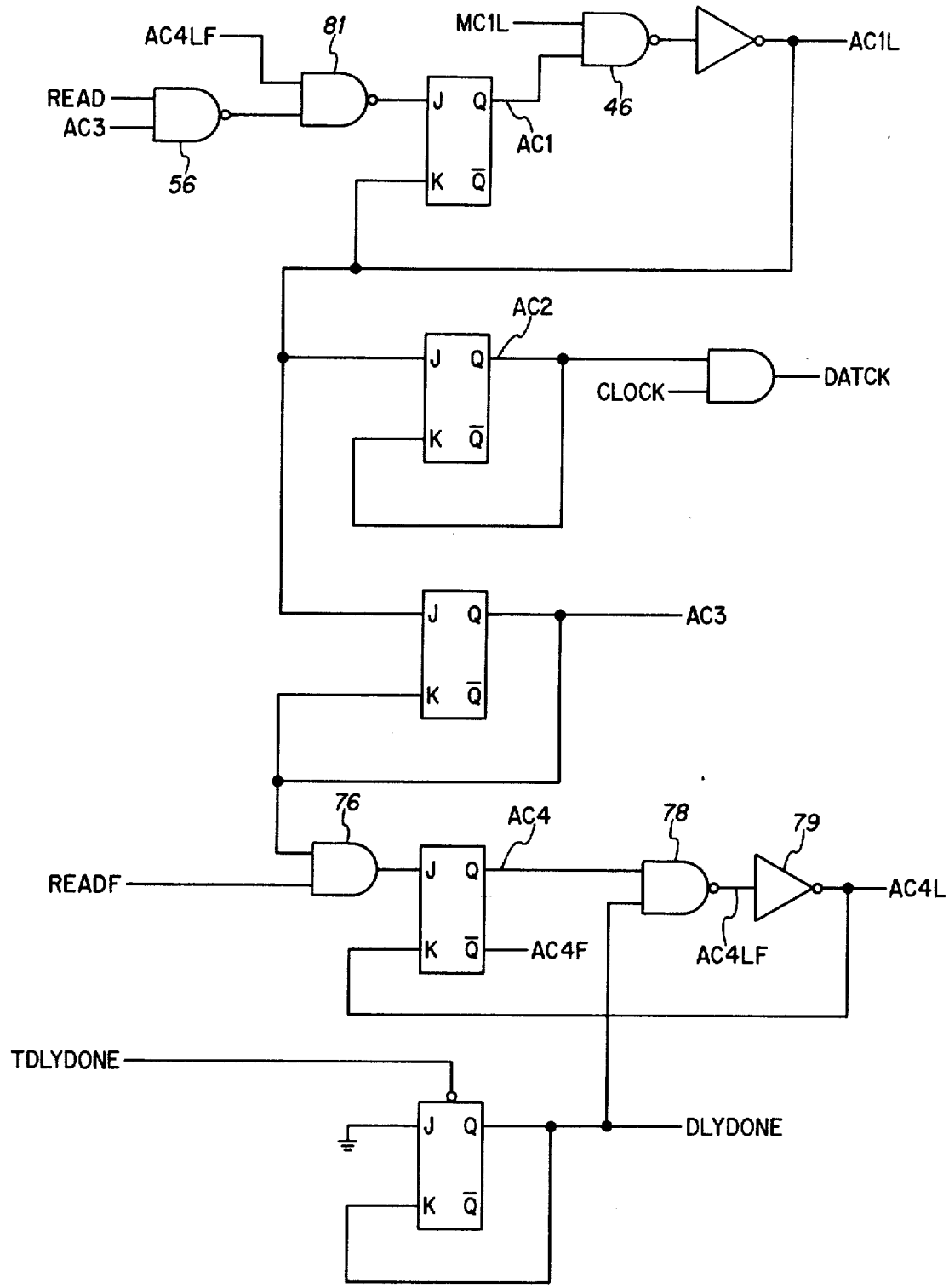
FIG. 7 is a logic diagram of an access control in the memory unit of FIG. 4.

The first waveform of FIG. 8 is the system clock input to the flip-flops of the logic of FIGS. 5-7. The next waveform is IN1, the true output of a flip-flop in the logic diagram of FIG. 5. For clarity and convenience, the flip-flops to be described herein will be identified by the reference numeral of their true outputs. As can be seen in FIG. 8, IN1 is true in the period before time T1. The false output IN1F is applied to NAND gate 36, which is in turn applied to AND gate 37 along with the system clock (shown in FIG. 8). The output IRCK of gate 37 serves as a clock input to input registers 22 and 23, as indicated in FIG. 4. The result of the action of gates 36 and 37 is that when IN1 is in the true state, the input registers 22 and 23 are clocked to accept information from the buses A and B, respectively.

The variable IN1L, which is connected to the J input of the IN2 flip-flop, is computed by a NOR gate 39 with AND gates 40 and 41 at its inputs. The inputs to AND gate 41 are the results from module address comparison and parity check circuit 16 (FIG. 4). When the variable MACJAF is false, it indicates that the memory module address portion of the word appearing on bus A compares exactly with the address of memory unit 10. When the variable MAPCJAF is false, it indicates that both the module address and the parity of the memory module address (bits 45-52) of the word appearing on bus A are good. The variables MACJBF and MAPCJBF are comparable indications for bus B. Both inputs to AND gate 40 are 1NIF, the false output of flip-flop IN1. The action of gates 39-41 is such that if the flip-flop IN1 is in the true state and any of the module address comparison or module address and parity comparisons are true, then the output IN1L of gate 39 will become true. That is, if the memory unit 10 is in a condition to receive input from the bus and there is any indication that the instructions on the bus are addressed to this particular memory unit, then IN1L will go true. This drives IN1 false and the output of flip-flop IN2 true at time T1.

The output IN2 is one input to AND gate 43, along with the system clock. When IN2 is true during the interval T1-T2, gate 43 generates a clock output MADCK (FIG. 8), which clocks the contents of the selected one of input registers 22 and 23 into the address register 33 (FIG. 4).

The master control sequence details are shown in FIG. 6. During the period T0-T1, all of the inputs to NOR gate 44 are false, except IN1. At time T1, IN1 becomes false also sending the output MC1L of gate 44 true.

FIG. 7 shows the logic diagram for the access control 19. Flip-flop AC1 begins with its true output in the true state. This output is applied to an input of NAND gate 46 along with MC1L from the master control sequence. When MC1L becomes true during T1-T2, the inverted output AC1L of NAND gate 46 becomes true, as seen in FIG. 8.

EVENTS DURING THE PERIOD T2-T3

At time T2, IN1 is driven true because all the inputs of NAND gate 47 were true during the period T1-T2, causing NAND gate 74 to apply a true state to the J input of flip-flop IN1. Two of the inputs are MC1L and IN2. The third, READJ, is one of the outputs of command multiplexer 29 (FIG. 4) which indicates that the received instruction in the input registers 22 and 23 is a read instruction. As shown in FIG. 8, READJ is true during the period T1–T2. When IN1F becomes false, an IRCK pulse is generated, clocking the first word of a write instruction into the input registers from the buses.

The IN2 flip-flop is reset by NAND gate 50 at its K input. Input MC1LF to NAND gate 50 is false during the period T1–T2. This drives the K input of IN2 true.

The output of the MC1 flip-flop becomes true at time T2, because MC1L at its K input was true during the period T1–T2. When MC1 becomes false, the false output of the flip-flop, MC1F, becomes true and causes the output of MC1L of gate 44 to become false.

The flip-flop MC3 is driven true by the action of AND gate 51 and OR gate 53 at the J input of the flip-flop. During the period T1–T2, both READJ and MC1L are true, causing AND gate 51 to output a true state. This true input to OR gate 53 drives the J input of flip-flop MC3 true.

The flip-flop AC1 is reset by the variable AC1L at its K input. As described above, AC1L was true during the period T1–T2. When AC1 does become false at time T2, then AC1L also becomes false.

Flip-flops AC2 and AC3 are set at time T2, receiving the true input from AC1L at the J inputs thereof. When AC3 becomes true, it starts delay line 55 (FIG. 4). A number of taps from the delay line are used to provide precise timing of commands to memory elements 31. For example, as seen in FIG. 8, RAS (row address strobe) commences at 40 nanoseconds after the start of the delay line, while CAS (column address strobe) begins 120 nanoseconds after the start of the delay line.

EVENTS DURING THE PERIOD T3–T4

Since IN1 was true during the period T2–T3, and since the words on the buses were presumed addressed to this memory unit, the output IN1L of gate 39 in FIG. 5 becomes true at time T3 and sets flip-flop IN2. When IN2 becomes true, it accomplishes a couple of results. For one thing, it is applied to the input of NAND gate 54 along with SEIZE. The SEIZE variable is a priority signal indicating that the second word of a two word instruction such as a write, is being sent on the bus. The SEIZE signal can be transmitted from a processor to a memory unit, for example, on a priority bus separate from the 53 bit message buses A and B. The effect of gates 54, 36 and 37 is such that SEIZE and IN2 cause the generation of an IRCK pulse during the period T3–T4, which brings the second word of the write instruction into the input registers from the buses. The other result of IN2 becoming true is to generate at the output MADCK of NAND gate 43 a pulse which clocks into the address register 33 the write instruction address brought into the input register at time T3.

The flip-flop AC1 is set at time T3 since both inputs to NAND gate 56 were true during the interval T2–T3. The variable READ is a state in command register 57 (FIG. 4) indicating the previously received read instruction. The other input to NAND gate 6 is AC3.

Flip-flops AC2 and AC3 are each reset at time T3 because each has its true output connected to the K input.

EVENTS DURING THE PERIOD T4–T5

Flip-flop IN2 is reset at time T4, because the input READJ to NAND gate 50 at the K input of flip-flop IN2 was false during the period T3–T4.

The flip-flop IN3 is set at time T4 because the NOR gate 59 was true at the J input of the flip-flop during the period T3–T4. Both inputs IN2F and READJ to the NOR gate were false during that period.

As can be seen in FIG. 6, there is an input TSYNC to the preset input of a flip-flop with a true output labeled SYNC. The variable SYNC becomes true between the lapsed times of 220 and 240 nanoseconds on the delay line 55. Upon the occurrence of SYNC, SYNC becomes true during the period T4–T5.

EVENTS DURING THE PERIOD T5–T6

At time T5, flip-flop MC1 is set by NAND gate 61. The output of NAND gate 61 was true during the period T4–T5, because one of its inputs MC3LF was false. Referring to circuitry associated with flip-flop MC3, it can be seen that MC3LF is the output of NAND gate 62. Both of the inputs MC3 and SYNC to the gate were true during the period preceding time T5.

Flip-Flop MC3 is reset by MC3L at its K input. As just previously described, MC3LF was false during the period T4–T5.

In FIG. 7, it is seen that flip-flop DYLDONE has applied to the preset input thereof a signal from delay line 55 labeled TDLYDONE. This latter signal occurs one clock period after TSYNC. It causes DLYDONE to become true during the period T5–T6.

EVENTS DURING THE PERIOD T6–T7

The variable MC1L becomes true at time T6, because BDRQ was true during the period T5–T6. The signal BDRQ is a cue that memory unit 10 has executed a bid request and is prepared to transmit data read from the memory elements 31 onto the buses A and B. The data register 34 is involved in the output process, with its outputs being one set of inputs to exclusive OR gates 64. The other inputs to the exclusive OR gates 64 are the corrected data output of error correcting circuitry 65. The output of the exclusive OR gates 64 forms the output of the memory unit 10 for transmission on the buses. It is important regarding the present invention that data register 34 is not available for use in the execution of a new instruction until it has completed its output function in the execution of the old instruction. The variable BDRQ is an appropriate signal that data register 34 is going to become available for completing the execution of a new instruction.

The variable AC1L becomes true during the period T6–T7, as the variable MC1L becomes true.

EVENTS DURING THE PERIOD T7–T8

Flip-Flop MC1 is reset at time T7, because MC1L became true at its K input, during the period T6–T7. The flip-flop MC2 is set at this time, because the inputs to NOR gate 68, MC1LF and READJ were both false during the period T6–T7. When MC2 has become true along with AC3, to be described below, then NAND gate 70 and inverter 71 causes MC2L to become true.

Flip-flop AC1 is reset at time T7, because AC1L was true at its K input during the period T6–T7. When AC1 becomes false, AC1L also is driven false. Flip-flops AC2 and AC3 are set by AC1L being true during the period T6–T7. When AC2 goes true, it causes a DATCK pulse to clock the data portion of the second word of the READ instruction into data register 34 (FIG. 4). When AC3 becomes true, delay line 55 is started again, as can be seen in the waveforms RAS and CAS.

Referring to FIG. 5, it can be seen that IN3LF becomes true during the period T7-T8, since the inputs to NAND gate 73, IN3 and MC2L become true.

EVENTS DURING THE PERIOD T8-T9

At time T8, IN1 becomes true, because IN3LF was false during the period T8—T8, causing NAND gate 74 to apply a true state to the J input of flip-flop IN1. When IN1 becomes true, the input register clock pulses IRCK resume clocking received words from the buses to the input registers. Flip-flop IN3 is reset, because MC2L, at the K input thereof, was true during the period T7-T8. When IN3 becomes false during the period T8-T9, IN3LF becomes true.

Flip-flop MC1 is set at time T8, because the MC2LF input at NAND gate 61 was false during the interval T7-T8. MC2 is reset at time T7, because MC2L is true at the K input of the flip-flop during the period T7-T8. The variable MC2L itself becomes false during the interval T8-T9, because both of the inputs to gate 70 become false during that period.

The flip-flops AC2 and AC3 are reset at time T8 by their own true outputs being applied to their K inputs. At time T8, flip-flop C4 is set for the first time by the output of AND gate 76 at its J input. During the period T7-T8, the AC3 input to gate 76 was true. In the earlier period, T2-T3 in which AC3 was true, the variable READ was also true. This time, in the execution of a WRITE instruction, READ is false, and the READF input to gate 76 is true.

EVENTS DURING THE INTERVAL T10-T11

During the period T10-T11, the TDLYDONE tap of delay line 55 generates a pulse. This in turn causes DLYDONE to become true. With DLYDONE and AC4 both true at its inputs, NAND gate 78 generates a pulse output which is inverted by inverter 79 and applied as a true state to the K input of flip-flop AC4.

EVENTS DURING THE INTERVAL T11-T12

Flip-flop AC1 is set at time T11, because the output of NAND gate 78, AC4LF, was false during the period T10-T11. This caused NAND gate 81 to produce a true output to the J input of flip-flop AC1. Flip-flop AC4 is reset at time T11, because AC4L was true at the K input of the flip-flop during the period T10-T11.

Figure 9:
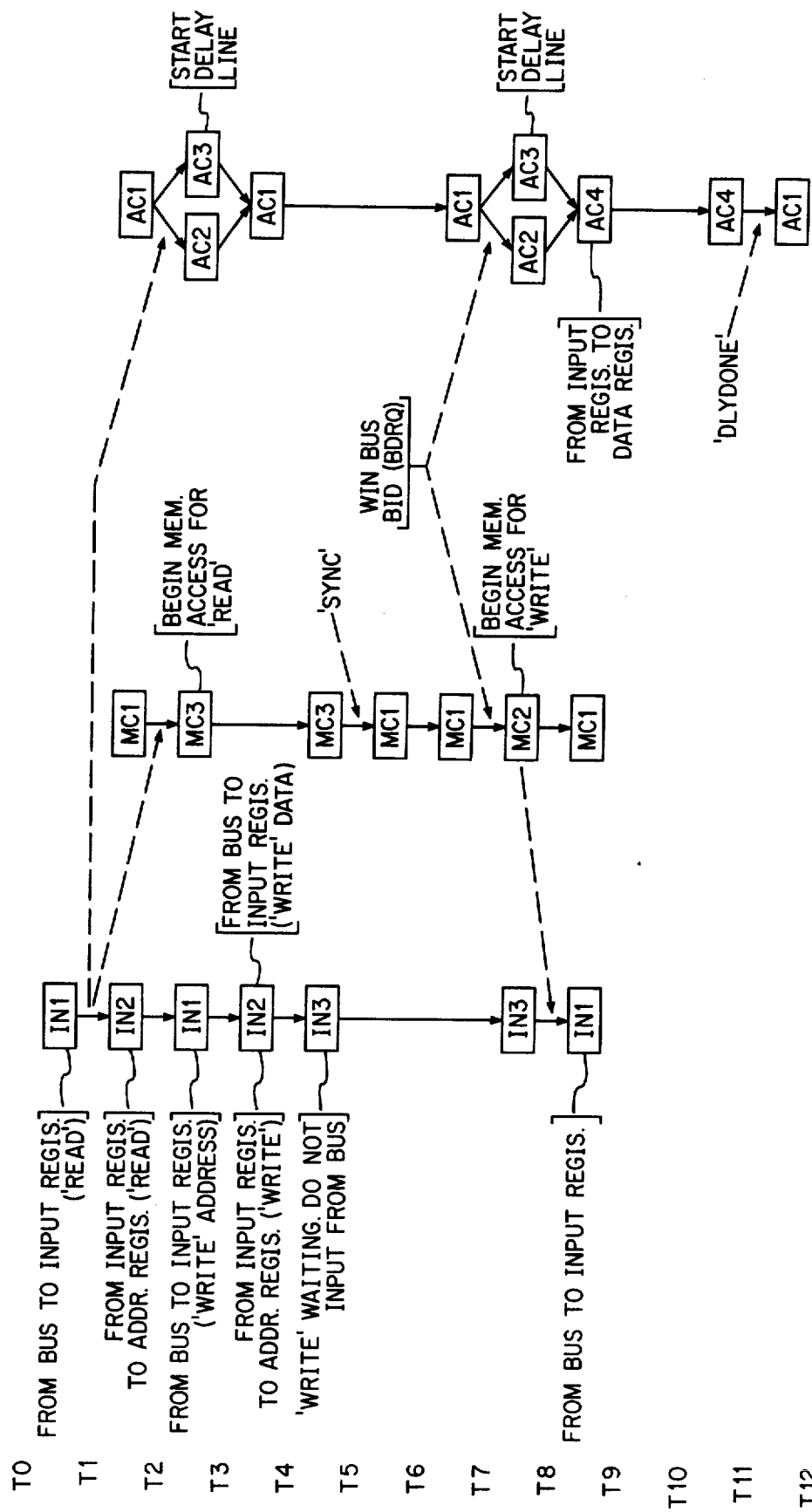
FIG. 9 is a state transition diagram for the operation illustrated in FIG. 8.

FIG. 9 recapitulates the example shown in the waveforms of FIG. 8, illustrating some of the interaction between portions of the control systems, along with labeling to indicate the significance of various events. The boxes marked IN1, MC1 and so forth will be considered to be "states". When flip-flop IN1 is set, with its true output true, the input sequence control will be considered to be in the IN1 state. Clock times from T0-T12 are indicated descending along the left margin of the Figure.

At the beginning of the example, the input sequence control is in the IN1 state. In this state, it causes a portion of the word received on each bus, namely bits 0–43, to be transferred to an input register. In the particular example, it is a portion of a read instruction that is transferred to an input register for each bus.

At time T1, there is a transition from the IN1 state to the IN2 state. In IN2, the input sequence control initiates the transfer of the read instruction memory address which is in the input registers to the address register 33.

The transition from IN1 to IN2 causes a transition in the master control sequence from MC1 to MC3, as indicated by a broken line arrow. By making the transition from MC1 to MC3, the master control sequence is indicating the beginning of a memory access for a read instruction. The master control sequence stays in MC3 for several clock periods, while the memory access is being executed.

Another result of the transition from IN1 to IN2 is in the access control, which goes from AC1 to both AC2 and AC3. In the AC3 state, delay line 55 is started to time various events associated with the use of memory elements 31. The access control quickly switches back from AC2 and AC3 to the AC1 state, where it remains for several clock cycles, waiting for output to complete and for new input.

From the IN2 state, the input sequence control moves back to IN1. In IN1, the control initiates the transfer of a portion of the write instruction on the buses into the input registers. The input sequence control then leaves IN1 to go to IN2, where two events occur. The control commands the transfer of the write instruction address, which is in the input register, to the address register. In addition, it commands the acceptance from the buses to the input registers of a portion of the second word of the write instruction, namely the word containing data.

At this point, the input sequence control makes the transition from IN2 to IN3. Since the control is not in IN2, it is not transferring information out of the input registers. Since it is not in IN1, it is not transferring words from the bus into the input register. As a result, the portion of the second word of the write instruction can reside safely in the input registers without being overwritten, while the execution of the previously received read instruction is being completed.

In the master control sequence, the generation of the SYNC signal in response to a delay line event, sends the control from MC3 back to the MC1 state. It is in the MC1 state, when the occurrence of BDRQ indicates a bus bid and signals that the data register 34 will become available for the execution of the write instruction. The occurrence of BDRQ results in a transition from MC1 to MC2. This state MC2 signals the beginning of memory access for the write instruction. After this, the master sequence control makes the transition from MC2 back to MC1, where it remains.

The occurrence of BDRQ also gives rise to a transition in the access control from AC1 to AC2 and AC3. Again, AC3 causes the start of the delay line. In AC2, there is initiated the transfer from the input register to the data register of the data portion of the write instruction.

The access control quickly moves from AC2 and AC3 to the AC4 state, where it remains until a delay line event causes the DLYDONE signal. This signal initiates the transition from AC4 back to AC1.

The occurrence in the master control sequence of the MC2 state in the interval T7-T8, causes the input sequence control to switch from IN3 back to IN1. In IN1, the memory unit can begin to take in new instructions into the input registers from the bus, now that the input registers are free.

Thus, while memory unit 10 is executing a first instruction, a second instruction can be held in input registers 22 and 23, until the data register (or address register, as appropriate) is no longer required for the execution of the first instruction. While the second instruction is held in the input registers, it is protected from being overwritten by new information from the buses by the operation of input sequence control 18. In the example of FIG. 9, the sequence control 18 enters state IN3 instead of IN1, so that no further instructions will be clocked into the input register from the buses. Meanwhile, the function of parity, bus comparison and selection logic 25 is being carried out, checking the contents of the input registers for errors and selecting between buses A and B. Then, upon the receipt of the SYNC and BDRQ signals, the master control sequence 20 and access control 19 are informed that the data register is about to become available. When the access control switches from state AC1 to AC2, it moves the data portion of the second instruction from one of the input registers to the data register. Thereupon, the input sequence control can switch from IN3 back to IN1 to allow the acceptance of further instructions from the buses.

Although preferred embodiments of the invention have been described in detail, it is to be understood that various changes, substitutions and alterations can be made therein, without departing from the spirit and scope of the invention as defined by the appended claims.

I claim:

1. A memory unit for operating with first and second signal conductor buses, comprising:
    means for executing a memory instruction;
    means for accepting a first memory instruction from each of said buses and sending one of said first memory instructions to said means for executing, then accepting a second memory instruction from each of said buses before completion of the execution of the first memory instruction by said means for executing; and
    means for performing, during said completion of the execution of the first memory instruction, the tasks of examining said second memory instructions as received on each of said buses and computing whether to utilize said second memory instruction as received on said first bus and whether to utilize said second memory instruction as received on said second bus.

2. A memory unit for executing instructions received from a bus, comprising:
    at least one input register;
    a plurality of additional registers, including a data register;
    means including memory storage elements for executing an instruction including utilizing said additional registers;
    control means for entering a portion of a word of a first instruction into said input register from said bus, for moving said first instruction word portion from the input register to one of said additional registers to be used by said means for executing, for entering a portion of a word of a second instruction into said input register from said bus, for causing said second instruction word portion to be held in said input register so long as the one of said additional registers appropriate to receive the held second portion is required for execution of the first instruction, and for preventing entering another portion of a word from said bus into the input register while the second instruction word portion is being held therein,
    whereby the memory unit is capable of receiving a second instruction from the bus before completion of execution of a first instruction.

3. The memory unit of claim 2, additionally including means for beginning to check said second instruction word portion in said input register for errors, during said completion of the execution of said first instruction.

4. The memory unit of claim 2, wherein said first instruction includes a memory address and the one of said additional registers to which said first instruction word portion is moved is an address register.

5. The memory unit of claim 2, wherein said portion of a word of the first instruction is the second word of a multiple word instruction and includes data, and wherein the one of said additional registers to which said first instruction is moved is a data register.

6. The memory unit of claim 2, wherein said portion of a word of a second instruction includes a memory address and the one of said additional registers appropriate to receive the portion held in the input register is an address register.

7. The memory unit of claim 2, wherein said portion of a word of a second instruction is a second word of a multiple word instruction and includes data, and wherein said appropriate additional register is a data register.

8. Memory unit for executing instructions from a bus, each instruction including one or more words, comprising:
    an input register;
    a plurality of additional registers, including an address register and a data register;
    means, including memory storage elements, for executing an instruction including utilizing said additional registers;
    control means for entering a portion of a first word of a first instruction from said bus into said input register, then moving said portion from the input register to said address register, and if said first instruction includes a second word, for entering a portion of said second word from said bus into said input register and then moving said portion of said second word into said data register, for receiving a portion of a first word of a second instruction from said bus into said input register and then from the input register into said address register, for causing, upon receipt of a further portion which is a second word of said second instruction, said further portion to be entered from said bus into the input register and held in the input register so long as said data register is required for execution of the first instruction, and for preventing entering another portion of a word from said bus into the input register while said further portion is being held therein,
    whereby the memory unit is capable of accepting a second instruction from the bus before completing the execution of a first instruction.

* * * * *